C. I. HELM.
TREE BALLING DEVICE.
APPLICATION FILED OCT. 23, 1913.

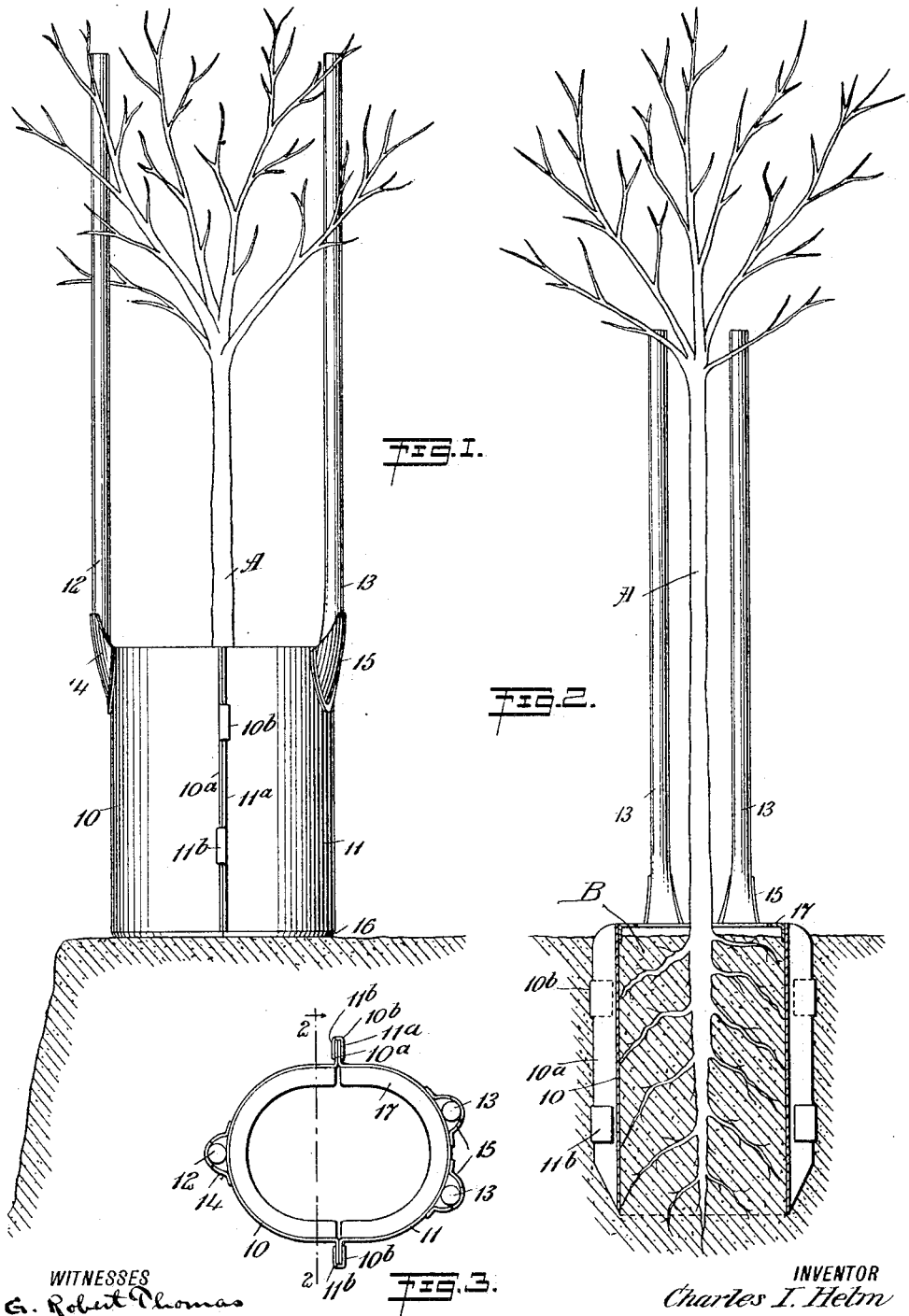

1,117,844.

Patented Nov. 17, 1914.
2 SHEETS—SHEET 2.

WITNESSES
G. Robert Thomas
J. L. McAuliffe

INVENTOR
Charles I. Helm
BY
Munn & Co
ATTORNEYS

UNITED STATES PATENT OFFICE.

CHARLES I. HELM, OF PHOENIX, ARIZONA.

TREE-BALLING DEVICE.

1,117,844.  Specification of Letters Patent.  Patented Nov. 17, 1914.

Application filed October 23, 1913. Serial No. 796,843.

*To all whom it may concern:*

Be it known that I, CHARLES I. HELM, a citizen of the United States, and a resident of Phoenix, in the county of Maricopa and State of Arizona, have invented a new and Improved Tree-Balling Device, of which the following is a full, clear, and exact description.

In digging young trees and preparing them for shipment to be transplanted, the present methods of digging the tree and wrapping the ball around the roots are very destructive, in causing a loosening of the soil around the roots, which results in the case of semi-tropical trees in a very high percentage of loss.

Ordinarily in balling trees, the method is to dig down alongside the tree, then under the same, cutting the tap or main root, and then digging around the tree and prying it out with a long spade, the tree being then slid off the spade onto a piece of burlap which is wrapped and tied around the ball. In a large percentage of cases the balls break to pieces, the breakage occurring most frequently in sliding off from the spade and in rolling the ball around while tying.

An object of my invention is to perform the work of digging and balling without disturbing the roots or soil.

It is a further object of my invention to facilitate the work indicated, and these objects I have successfully accomplished by the use of the novel device hereinafter particularly described.

Reference is to be had to the accompanying drawings forming a part of this specification, in which similar characters of reference indicate corresponding parts in all the views.

Figure 4:
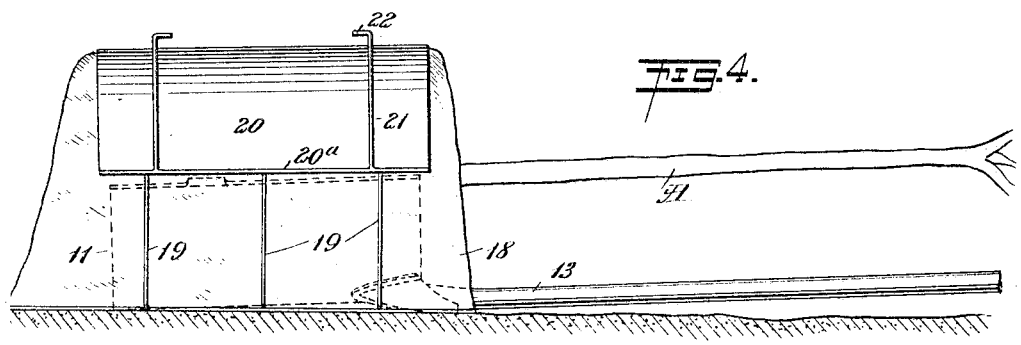
Figure 5:
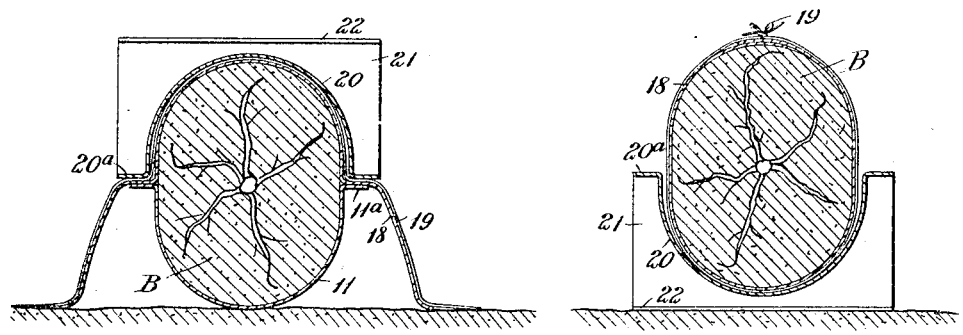
Figure 6:
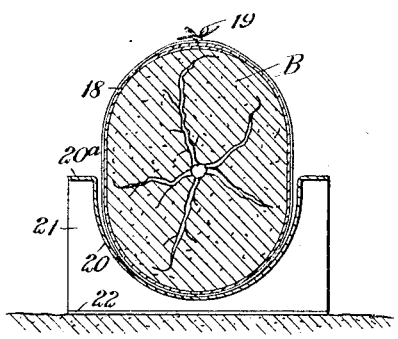
Figure 7:
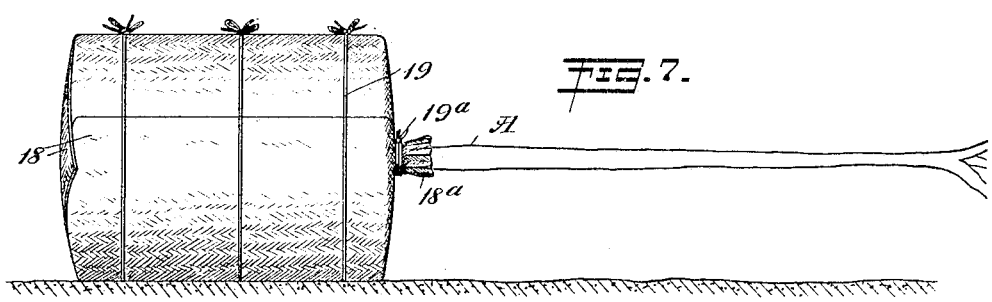

Figure 1 is a side elevation of two of the elements of the device assembled to be used in digging the tree with the solid ball and for holding the ball solidly around the roots while the tree is turned over; Fig. 2 is a vertical section on the line 2—2 of Fig. 3; Fig. 3 is a plan view; Fig. 4 is a side elevation showing one of the digger sections removed, and a co-acting device employed with the remaining digging section for holding the burlap; Fig. 5 is a cross section of the parts arranged as in Fig. 4; Fig. 6 is a cross section with the digger sections entirely removed, and the auxiliary device forming a bed for the ball, the latter being indicated in the wrapped condition; and Fig. 7 is a side elevation of the tree with the ball completely wrapped.

In carrying out my invention digger sections 10, 11, are provided, the same being curved in horizontal section so that when assembled they will form a shell to inclose the ball of a tree at the sides, said shell being arranged to constitute a tubular digger. The one section 10 is provided with a handle 12, and the other section with a pair of handles 13, the handle 12 being received in the socket 14 at the upper end of its section, and the handles 13 being received in similar sockets 15 on the other section.

The edges of the section 10 are provided with outwardly disposed flanges $10^a$, and the section 11 with similar flanges $11^a$, the flanges $10^a$ being formed with return lugs $10^b$ constituting hooks, and the flanges $11^a$ with similar return lugs $11^b$. The arrangement is such that the flanges, when the sections are brought together, lie against each other, the flange of one section having vertical sliding movement on the flange of the other section, and having guided engagement in the return members of the other section. At the lower ends the sections have cutting edges 16, and at the top each section is strengthened by a suitable reinforcing member 17, which is here shown as in the form of an angle iron which follows the curvature of the respective sections and overhangs at the interior, as best shown in Fig. 2.

In employing the digger, a deep furrow is run along one side of the row from which the trees are to be taken, a common plow serving for the purpose, in order that later, the trees may be pried out easily. The one digger section, say 10, is then placed vertically alongside the tree, and the other section placed at the opposite side of the tree and slid downward into engagement with the first section by reason of the flanges $10^a$, $11^a$, and their hooked members $10^b$, $11^b$. A maul or heavy mallet is now employed to strike driving blows on the sections alternately, the disposition of the elements $10^b$, $11^b$, being such that the sections may mutually project the one beyond the other alternately in response to the blows thereon without the sections becoming disengaged. When the two sections have been driven downward to the proper depth, and the digger sections are even, then the tree with the digger device surrounding the roots thereof is pried out principally by the use of the section with the two handles, and the tree with the device thereon is laid along the ground with the section 11 having the two handles underneath. In this position the two handles which are disposed at opposite sides of the center of the section form with their sockets, rests or supports, being in fact, incipient legs disposed so that the tree and device will not have a tendency to rock. If any of the main tap roots project from the lower end of the ball, they are clipped off with shears. The upper section having the single handle is then slid from the other. A square of burlap, indicated by the numeral 18, is then spread over the ball B, the burlap being of a size to be wrapped completely around the ball at the sides, and to overlap, and also of a size to project beyond the ends of the ball. Tying cords 19 are then laid on top of the burlap in such numbers and such positions as judgment may dictate, for the proper tying of the burlap in place, and an auxiliary device 20 curved in cross section to correspond approximately with the digger section 10 is placed on top of the burlap and cords. The section 20 is formed with longitudinal outwardly disposed flanges 20$^a$, corresponding approximately with the flanges on the digger section. In addition the section 20 is formed with transverse flanges or ribs 21, the longitudinal edges of which flanges are turned over at approximately right angles, as at 22. The tree, with the ball thereon and with the sections 11 and 20 in position, and the burlap in place as described, is now turned over, bringing the section 20 lowermost and forming a bed for the ball B, so that the transverse ribs 21 constitute legs or supports, and the turned-over edges 21 of the rib form feet. The section 11 which will have been brought uppermost is now removed, after which the burlap 18 is wrapped around the ball and the transverse cords 19 tied. The end of the burlap adjacent to the tree trunk is gathered around the latter and tied as at 18$^a$ with a cord 19$^a$.

The various steps of digging the tree and wrapping the same are completed without disturbing the soil around the roots, and the wrapping is applied and secured in a manner to maintain the ball intact until received by the purchaser.

My invention is particularly useful in balling such trees as the citrus, fig, date palm, and the like, which are rather costly and the loss of which by present methods of balling is very great.

Having thus described my invention, I claim as new, and desire to secure by Letters Patent:

1. A device of the character described, comprising a shell composed of separable sections formed with laterally projecting flanges along their meeting edges, the flanges of one section having guide members engaging the flanges of the other section, the sections being longitudinally slidable relatively to each other to alternately project one section beyond the other section when forcing the sections into the ground, and handles on said sections.

2. A device of the character described comprising a shell composed of separable sections formed with longitudinally-ranging, laterally projecting flanges at their sides, the flanges of one section forming rests for the flanges of the other section when the device is laid on its side, and one of the sections having on the back thereof means to constitute a rest for the device when laid on its side.

3. A device of the character described, comprising a shell composed of separable sections having longitudinal movement relatively to each other, the meeting edges of the sections having laterally extending longitudinal flanges, and there being means associated with the flanges to guide the one section on the other.

4. A device of the character described, comprising a shell composed of separable sections, and handles on the sections extending longitudinally at one end of the device, the one section having a pair of handles adapted to constitute a rest for the device when laid upon the ground.

5. In a device of the character described, a shell composed of separate sections formed with laterally projecting flanges along the meeting edges, the one section having members thereon projecting laterally on the exterior and constituting supports to prevent rocking when the said section is laid on the ground.

In witness whereof I have signed my name to this specification in the presence of two subscribing witnesses.

CHARLES I. HELM.

Witnesses:
H. LEPPLA,
LUELLA GATES.

Copies of this patent may be obtained for five cents each, by addressing the "Commissioner of Patents, Washington, D. C"